H. SCHWANENBERG.
EVAPORATING APPARATUS.
APPLICATION FILED MAR. 14, 1917.
1,242,481.
Patented Oct. 9, 1917.
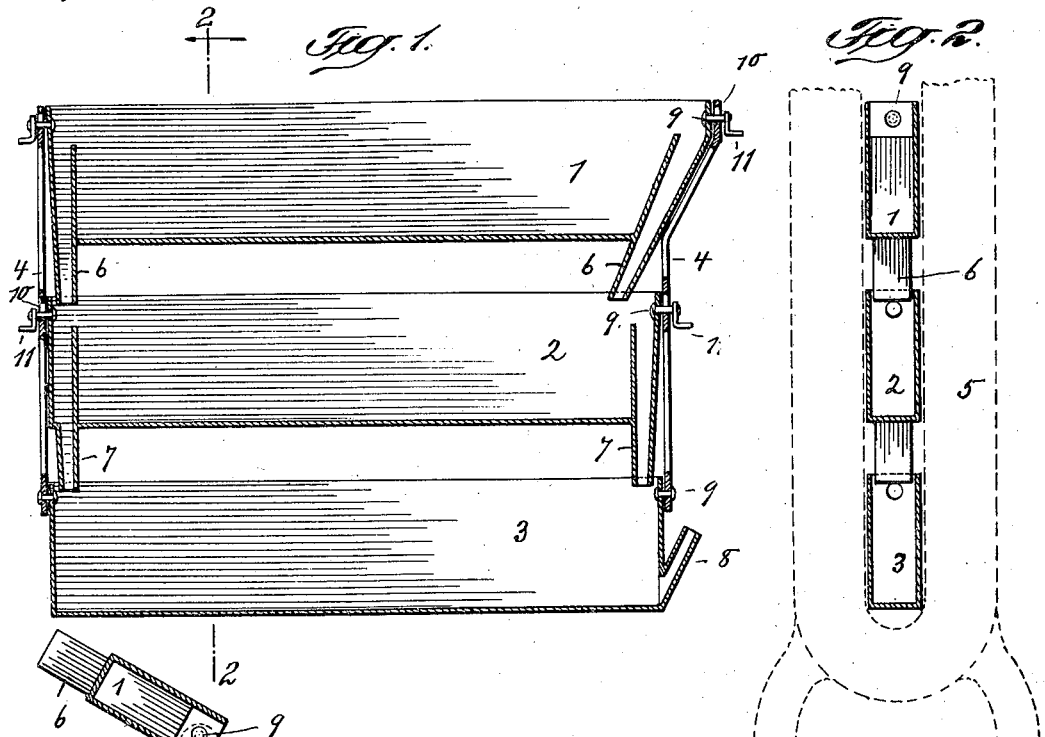
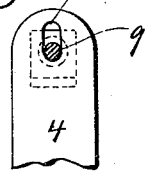
Inventor
Hermann Schwanenberg
By his Attorney

UNITED STATES PATENT OFFICE.

HERMANN SCHWANENBERG, OF TOMPKINSVILLE, NEW YORK.

EVAPORATING APPARATUS.

1,242,481. Specification of Letters Patent. Patented Oct. 9, 1917.

Application filed March 14, 1917. Serial No. 154,803.

*To all whom it may concern:*

Be it known that I, HERMANN SCHWANENBERG, a citizen of the United States, and a resident of Tompkinsville, in the county of Richmond and State of New York, have invented certain new and useful Improvements in Evaporating Apparatus, of which the following is a specification.

This invention relates to an evaporating apparatus of novel construction, more particularly adapted for the evaporation of water by the heat of radiators or hot air registers, so as to prevent an excessive dryness of air in living rooms. The apparatus is so constituted that it may be readily fitted to the radiator, that it exposes a large surface of water to the air, and that it may be readily cleaned.

In the accompanying drawing:

Figure 1 is a vertical longitudinal section of an evaporating apparatus embodying my invention;

Fig. 2, a vertical cross section on line 2—2 Fig. 1;

Fig. 3, a similar section showing the troughs tilted;

Fig. 4, a detail of one of the trough bearings.

The apparatus comprises a series of superposed water troughs or containers 1, 2, 3 three being shown, though a different number may be employed. The troughs are spaced in such a manner as to create intervening air passages so that the water within the troughs may evaporate freely. They are pivoted at both ends to flat upright bars or supports 4, so that they may be tilted for discharging sediments and of rendering them accessible for cleaning purposes. The width of the bars is equal substantially to the width of the troughs, and should be so restricted that the device may be readily slipped into the opening formed between the front and rear sections of a radiator 5, though if desired, the device may be secured to the radiator in different manner.

From near the top of the upper trough 1, there extends a distance into the second trough 2, a pair of overflow pipes 6, while similar pipes 7 extend from near the top of trough 2, a distance into the bottom trough 3. Thus if water is poured into the top trough, it will after filling the same, fill trough 2 through pipes 6, and then trough 3 through pipes 7, the latter trough being provided with a nozzle 8, which permits the escape of any surcharge of water.

Inasmuch as pipes 6, 7 extend a distance into troughs 2 and 3 respectively, they would be apt to prevent the turning of troughs 1 and 2 on their pivots 9. In order to overcome this impediment, the pivots of troughs 1 and 2 pass through upright slots 10 of bars 4, and are provided at their protruding ends with finger pieces 11, by means of which the troughs may be slightly raised at both ends. This raising of the troughs will cause pipes 6 and 7 to clear troughs 2 and 3, so that in this way, the latter are now free to be turned in the manner indicated in Fig. 3. After the troughs have been cleaned, they are again righted and lowered into their normal position by depressing finger pieces 11.

As shown, the upper trough 1, is flared laterally at one end, while one of the bars 4 is correspondingly flared. This flaring end of the trough projects a distance beyond the lower troughs and permits the upper trough to be readily filled without necessitating the withdrawal of the apparatus from the radiator.

I claim:

1. An evaporating apparatus comprising a pair of supports provided with a series of upright slots, a series of spaced superposed troughs, pivots on said troughs that engage said slots, finger pieces on the pivots, and overflow pipes extending from near the top of any one trough into the trough next below.

2. An evaporating apparatus comprising a pair of supports, a series of spaced superposed troughs pivoted thereto, the uppermost trough having a flared end that projects a distance beyond the lower troughs, and overflow pipes extending from near the top of any one trough toward the trough next below.

HERMANN SCHWANENBERG.